(12) United States Patent
Lee

(10) Patent No.: US 6,287,995 B1
(45) Date of Patent: Sep. 11, 2001

(54) COMPOSITION OF SEALING GLASS

(75) Inventor: Yoon Kwan Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/316,020

(22) Filed: May 21, 1999

(30) Foreign Application Priority Data

May 28, 1998 (KR) .................................................. 98-19394

(51) Int. Cl.$^7$ ............................... C03C 8/04; C03C 8/08; C03C 8/10; C03C 8/14; C03C 8/20

(52) U.S. Cl. ............................... 501/15; 501/17; 501/18; 501/21; 501/22; 501/24; 501/26; 501/45; 501/48; 501/76; 501/79

(58) Field of Search .................................. 501/15, 17, 18, 501/21, 22, 24, 26, 45, 47, 48, 76, 79

(56) References Cited

U.S. PATENT DOCUMENTS

| | | | |
|---|---|---|---|
| 3,088,835 | * | 5/1963 | Pirooz . |
| 3,837,866 | * | 9/1974 | Malmendier et al. . |
| 4,578,619 | * | 3/1986 | Braude ................................... 501/76 |
| 5,122,484 | * | 6/1992 | Beall et al. ............................ 501/46 |
| 5,179,047 | * | 1/1993 | Chiba .................................... 501/15 |
| 5,246,890 | * | 9/1993 | Aitken et al. ......................... 501/15 |
| 5,534,469 | * | 7/1996 | Hayashi et al. ....................... 501/15 |
| 5,733,828 | * | 3/1998 | Usui et al. ............................. 501/17 |

OTHER PUBLICATIONS

Weast, ed., Crc Handbook of Chemistry and Physics, pp. B123 to B–124, 1969.*

* cited by examiner

Primary Examiner—David R Sample
(74) Attorney, Agent, or Firm—Fleshner & Kim, LLP

(57) ABSTRACT

A sealing glass composition for bonding the upper plate and the lower plate of a flat panel display device is described. The sealing glass composition includes a low melting point glass containing PbO of less than 20% and having a sintering temperature of less than 500° C. The sealing glass composition contains a low component of PbO to thereby decrease environmental contamination and increase work efficiency. Also, the sealing glass prevents the deformation and cracking of a substrate caused by thermal and mechanical stress and reduces the sintering temperature to thereby enhance the airtightness of the sealing glass.

17 Claims, 3 Drawing Sheets

COMPOSITION OF SEALING GLASS

BACKGROUND OF THE INVENTION

1. Field of the Invention

This invention relates to a composition for a display device, and more particularly to a composition of sealing glass for bonding the upper and lower substrates of a flat panel display device.

2. Description of the Prior Art

Recently, there have been actively developed flat panel display devices such as a liquid crystal display(LCD), a field emission display(FED), a plasma display panel(PDP) and so on. In the flat panel display device, the PDP has advantages in that it provides ease of manufacture of a large-scale screen due to its simple structure, and that it has a light view angle more than 160° and characteristics of being thin and light weight. The PDP exploits a gas discharge phenomenon to display a picture by radiating a fluorescent material with a vacuum ultraviolet ray generated during a gas discharge. A typical structure of the PDP will be described with reference to FIG. 1 below.

FIG. 1 shows a structure of a discharge cell arranged in a matrix pattern in the conventional PDP. The PDP discharge cell includes an upper plate 28 having a sustaining electrode pair 12A and 12B, an upper dielectric layer 14 and a protective film 16 that are sequentially formed on an upper substrate 10, and a lower plate 30 having an address electrode 20, a lower dielectric layer 22, a barrier rib 24 and a fluorescent material layer 26 that are sequentially formed on a lower substrate 30. The upper substrate 10 is spaced in parallel from the lower substrate 18 by the barrier rib 24. The sustaining electrode pair included in the upper plate 28 consists of a scanning/sustaining electrode 12A and a sustaining electrode 12B. The scanning/sustaining electrode 12A is responsible for applying a scanning signal for an address discharge and a sustaining signal for a sustained discharge, etc. On the other hand, the sustaining electrode 12B is responsible for applying a sustaining signal for a sustained discharge, etc. The upper dielectric layer 14 is formed on the upper substrate 10 on which the sustaining electrode pair 12A and 12B is provided. The protective film 16 is coated on the surface of the upper dielectric layer 14. A MgO film is usually used as the protective film 16. The protective film 16 protects the upper dielectric layer 14 from the sputtering phenomenon of plasma articles to prolong the life of the PDP and improve an emission efficiency of secondary electrons. Also, the protective film 16 reduces a variation in the discharge characteristic of a refractory metal due to a contamination of oxide. The address electrode 20 included in the lower plate 30 is formed on the lower substrate 18 in such a manner to be crossed with the sustaining electrode pair 12A and 12B. The address electrode 20 serves to apply a data signal for the address discharge. The lower dielectric layer 22 is formed on the lower substrate 18 on which the address electrode 20 is provided. The barrier rib 24 is arranged in parallel to the address electrode 20 on the lower dielectric layer 22. The barrier rib 24 serves to provide a discharge space at the inner side of the discharge cell so as to shield electrical and optical interference between the adjacent discharge cells. Also, the barrier rib 24 serves to support the upper substrate 10 and the lower substrate 18. The fluorescent material layer 26 is coated on the surfaces of the lower dielectric layer 22 and the barrier rib 24 to generate a red, green, or blue visible ray. Further, an inactive gas for the gas discharge is sealed into the discharge space. The PDP discharge cell having a structure as described above maintains a discharge by a surface discharge between the sustaining electrode pair 12A and 12B after being selected by an opposite discharge between the address electrode 20 and the scanning/sustaining electrode 12A. In the PDP discharge cell, the fluorescent material 26 is radiated by an ultraviolet ray generated during the sustained discharge, thereby emitting a visible light to the outer side of the discharge cell. As a result, the PDP having discharge cells display a picture.

FIG. 2 explains a process of sealing the upper plate 28 and the lower plate 30 of the PDP shown in FIG. 1. Referring to FIG. 2, there are separately provided the upper plate 28 in which the sustaining electrode pair 12A and 12B, the upper dielectric layer 14 and the protective film 18 are sequentially disposed on the upper substrate 10, and the lower plate 30 in which the address electrode 20, the lower dielectric layer 22, the barrier rib 24 and the fluorescent material layer 26 are sequentially disposed on the lower substrate 13. Next, a PDP device is completed by sealing the upper plate 28 and the lower plate 30 after coating a sealing glass made in a paste state at the edge portion of the upper substrate 10, in which the sustaining electrode pair 12A and 12B, the upper dielectric layer 14 and the protective film 18 are not formed, in such a manner to have a width of about 1 Cm and a height of about 200 μm. In this case, a glass of $PbO$—$B_2O_3$—$ZnO$ group having a compositions as indicated in the following Table 1 is used as the sealing glass.

TABLE 1

| COMPO-NENT | PbO | $B_2O_3$ | ZnO | $SiO_2$ | $Al_2O_3$ | $Na_2O$ | $Li_2O$ |
|---|---|---|---|---|---|---|---|
| WEIGHT % | 75–82 | 6–12 | 7–14 | 1–3 | 0–3 | 0.3–0.5 | 0.1–0.2 |

FIG. 3 is a flow chart for explaining a formation method of a sealing glass making use of a glass of $PbO$—$B_2O_3$—$ZnO$ group step by step. Referring to FIG. 3, in step S1, a glass of $PbO$—$B_2O_3$—$ZnO$ group having compositions as indicated in Table 1 are prepared into a powder having a particle size of about 3 to 5 μp. Next, in step S2, the $PbO$—$B_2O_3$—$ZnO$ group glass powder is mixed with an organic vehicle, thereby making a paste state. In this case, a viscosity of the paste of about 100,000 cps is a proper value. In step S3, a sealing paste is coated on the edge portion of the upper substrate 10 by exploiting the screen printing technique. Subsequently, in step S4, a sealing of the upper and lower plates 28 and 30 is completed by matching the upper plate 28 and the lower plate 30 coated with the sealing paste and then calcining the same. In this case, a sealing of the upper and lower plates 28 and 30 is terminated by sintering and crystallizing the upper and lower plates 28 and 30 matched by the sealing paste during about 20 to 30 minutes at a temperature of about 450° C. under the atmosphere condition using a resistance heating furnace and cooling the same so as to form a sealing glass 32. At this time, a thermal expansion coefficient of the $PbO$—$B_2O_3$—$ZnO$ group glass is more than $100 \times 10^{-7}$° C. However, if the $PbO$—$B_2O_3$—$ZnO$ group glass is calcined, then a crystal structure of $ZnB_2O_4$ and $ZnO$—$2SiO_2$ is produced. Accordingly, a coefficient of the $PbO$—$B_2O_3$—$ZnO$ group glass is reduced to 85 to $90 \times 10^{-7}$° C., and a color of the sealing glass is changed into black.

However, after the final sealing, a slight crack is produced at the sealing glass due to a stress generated from the electrodes 12A, 12B and 20 defined on the upper and lower substrates 10 and 18, the upper and lower dielectric layer 22 and the fluorescent material layer 26, etc. in the course of performing a thermal treatment for sintering the PbO—$B_2O_3$—ZnO group glass. Also, since a sintering temperature of the PbO—$B_2O_3$—ZnO group glass has a relatively low value of less then 450° C., many air holes remain in the interior of the paste to deteriorate an airtightness of the PDP device. Accordingly, external air enters the internal discharge space of the PDP device to thereby deteriorate a discharge characteristic. Moreover, the PbO—$B_2O_3$—ZnO group glass contains above 70 weight % of toxic PbO oxide causing serious environment and work performance problems.

SUMMARY OF THE INVENTION

Accordingly, it is an object of the present invention to provide a composition of sealing glass that is capable of preventing a crack in a substrate due to stress.

A further object of the present invention is to provide a composition of sealing glass that provides an air tight seal and a low temperature sintering characteristic.

A further object of the present invention is to provide a composition of sealing glass that is capable of minimizing environment contamination and enhancing performance by reducing an amount of PbO.

In order to achieve these and other objects of the invention, a sealing glass composition includes a low melting point glass containing less than 20% and having a sintering temperature of less than 500° C. The low melting point glass further includes a glass of a $SiO_2$—ZnO—$B_2O_3$ group or a glass of a $P_2O_5$—ZnO—BaO group. Alternatively the low melting point glass further includes a glass of $SiO_2$—ZnO—$B_2O_3$ group or a glass of $P_2O_5$—ZnO—BaO group, a first oxide filler having a high strength and a low thermal expansion coefficient and a second oxide filler having a low melting point of less than 500° C.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
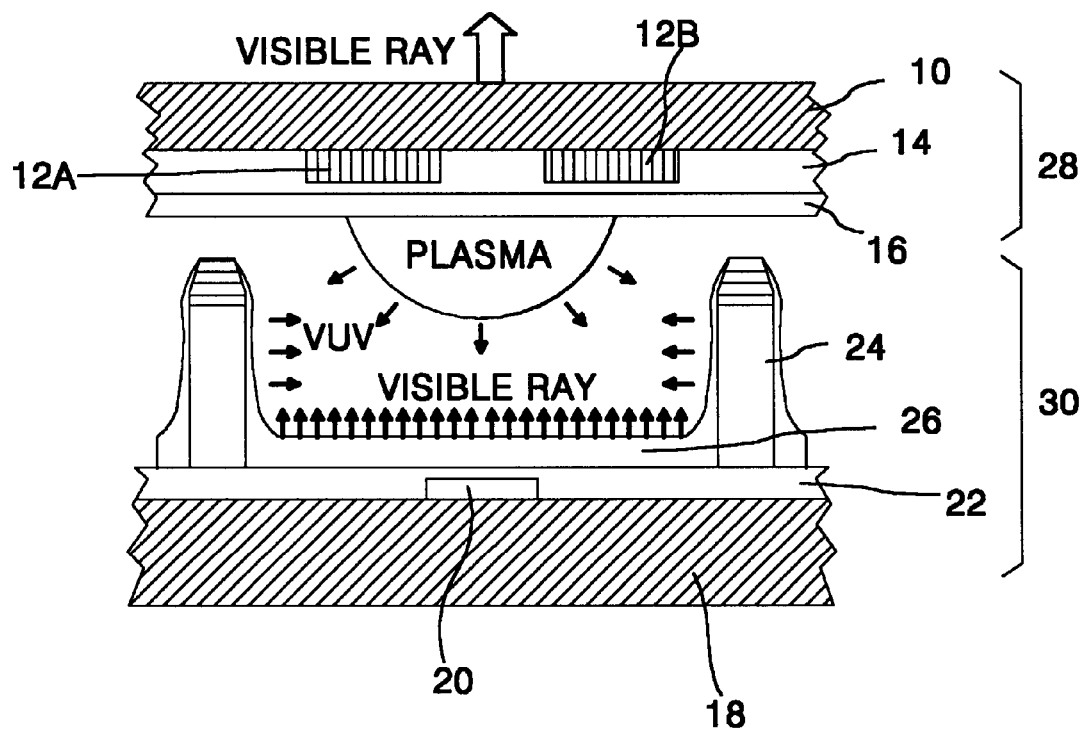
FIG. 1 is a sectional view showing the structure of a discharge cell in the conventional plasma display panel.
Figure 2:
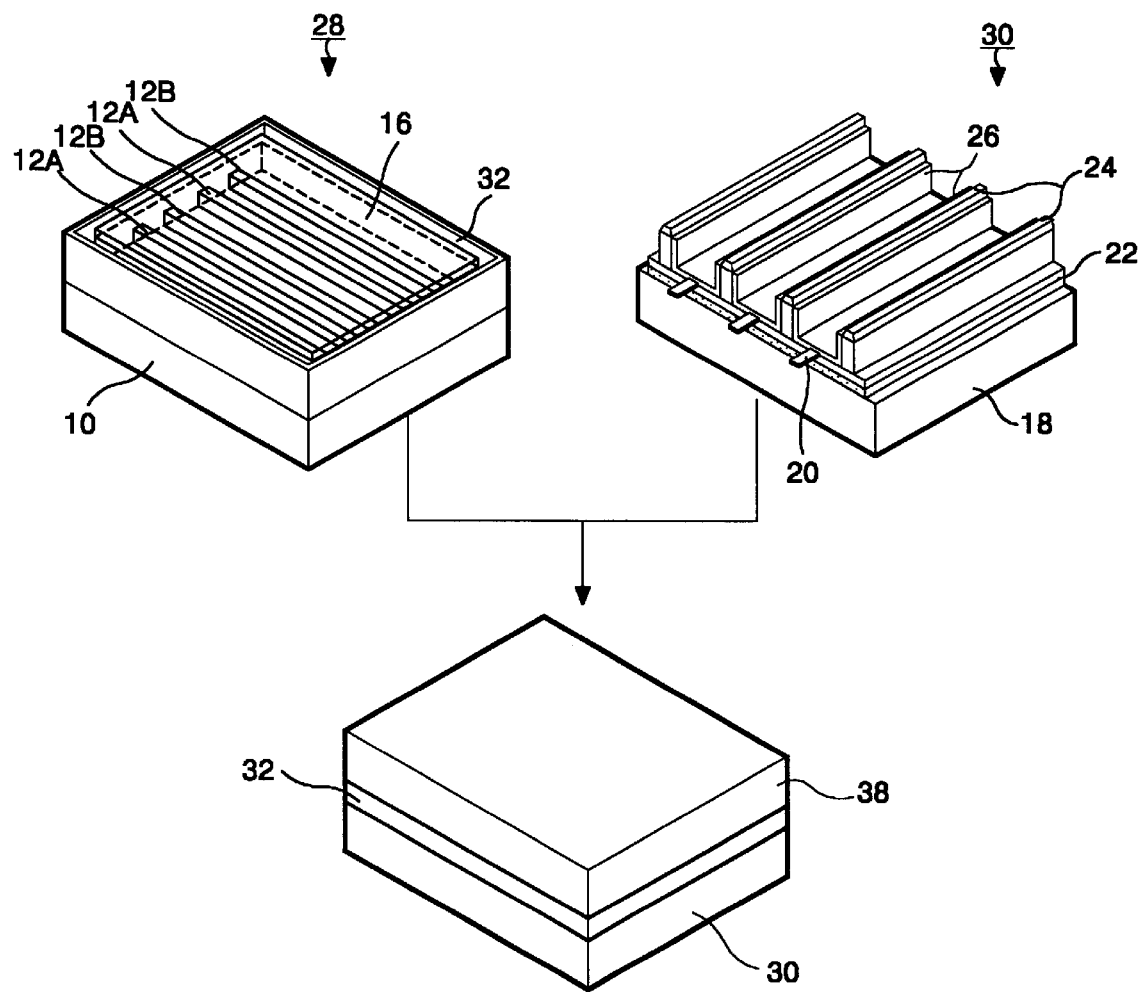
FIG. 2 explains a sealing process of the upper plate and the lower plate shown in FIG. 1.
Figure 3:
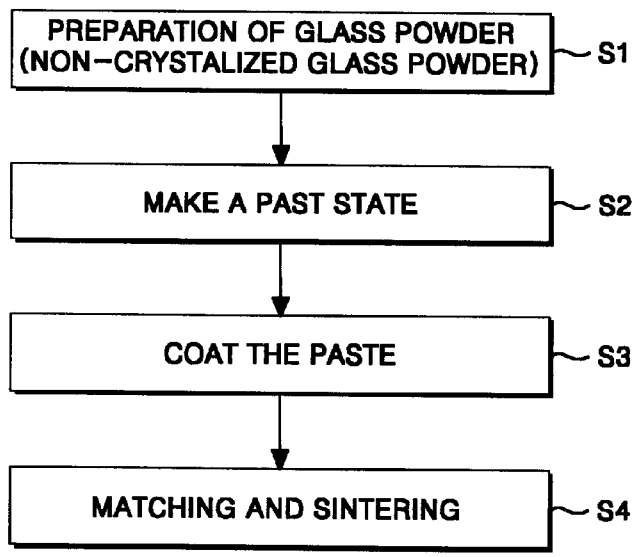
FIG. 3 is a flow chart for explaining a sealing glass formation method using the conventional composition of sealing glass step by step.

A parent glass of a sealing glass composition according to preferred embodiments of the present invention makes use of non-PbO glass and low-PbO glass. Specifically, a parent glass of a sealing glass composition according to preferred embodiments of the present invention makes use of $SiO_2$—ZnO—$B_2O_3$ group parent glass which is the non—PbO glass, and $P_2O_5$—ZnO—BaO group parent glass which is the low-PbO.

A sealing glass composition according to the first embodiment of the present invention includes $SiO_2$—ZnO—$B_2O_3$ group parent glass which is the non-PbO glass. In this case, the compositions is indicated in the following Table 2.

TABLE 2

| COMPONENT | $SiO_2$ | $K_2O$ | $Li_2O$ | $Na_2O$ | PbO | CaO | ZnO | $B_2O_3$ | $Al_2O_3$ |
|---|---|---|---|---|---|---|---|---|---|
| WEIGHT % | 15–25 | 2–10 | 0–5 | 2–8 | 3–20 | 1–5 | 25–45 | 12–25 | 1–7 |

In the Table 2, a ratio of the $SiO_2$—ZnO—$B_2O_3$ group parent glass composition is calculated assuming that the weight of the parent glass is 100 weight %. Such a $SiO_2$—ZnO—$B_2O_3$ group parent glass has a relatively low sintering temperature and a stable structure characteristic. Also, since the $SiO_2$—ZnO—$B_2O_3$ group parent glass has a tendency to allow a crystal of several μm to be formed very uniformly within the parent glass, it has a characteristic of high endurance to exterior thermal and mechanical impact.

A sealing glass composition according to the second embodiment of the present invention includes $P_2O_5$—ZnO—BaO group parent glass which is the low-PbO content glass. In this case, the component and ratio is indicated in the following Table 3.

TABLE 3

| COMPONENT | $P_2O_5$ | ZnO | $Li_2O$ | CaO | BaO | $B_2O_3$ | $Al_2O_3$ |
|---|---|---|---|---|---|---|---|
| WEIGHT % | 45–65 | 20–35 | 2–10 | 1–6 | 3–15 | 1–5 | 1–7 |

In the Table 3, a ratio of the $P_2O_5$—ZnO—BaO group parent glass composition is calculated assuming that the weight of the parent glass is 100 weight %. The P ion of $P_2O_5$, as a main component of such a $P_2O_5$—ZnO—BaO group parent glass, has a high ion field intensity corresponding to 43.2. Also the P ion having 5 valence electrons causes a phase separation because of forming an unstable structure in which one P—O combination per the $PO_4$ tetrahedron makes a double combination so as to keep an electrical neutrality. Since the $P_2O_5$—ZnO—BaO group parent glass includes the P ions, the $P_2O_5$—ZnO—BaO group parent glass is liable to be crystallized. Accordingly, the $P_2O_5$—ZnO—BaO group parent glass has a relatively low melting point, so that it can be sufficiently wetted to the glass substrate of the PDP device at the low temperature to maintain a good adhesion strength and can enhance airtightness in accordance with an enhancement of its crystallization.

A sealing glass composition according to the third embodiment of the present invention includes any one of the $SiO_2$—ZnO—$B_2O_3$ group parent glass and the $P_2O_5$—ZnO—BaO group parent glass, a first oxide filler and a second oxide filler. In this case, the component and ratio of the $SiO_2$—ZnO—$B_2O_3$ group parent glass and the $P_2O_5$—ZnO—BaO group parent glass is indicated in the above Table 2 and Table 3, the type and characteristic of the first oxide filler and the component ratio of the first oxide filler is indicated in the following Table 2.

TABLE 4

| TYPE | THERMAL EXPANSION COEFFICIENT (/° C.) | COMPONENT (WEIGHT %) |
|---|---|---|
| $TiO_2$ | $68 \times 10^{-7}$ | 5–30 |
| $\alpha$-$Al_2O_3$ | $66 \times 10^{-7}$ | |
| $2MgO \cdot 2Al_2O \cdot 5SiO_2$ | $26 \times 10^{-7}$ | |
| $Li_2O \cdot Al_2O_3 \cdot 4SiO_2$ | $9 \times 10^{-7}$ | |
| $BaO \cdot Al_2O_3 \cdot 2SiO_2$ | $27 \times 10^{-7}$ | |
| $CaO \cdot Al_2O_3 \cdot 2SiO_2$ | $45 \times 10^{-7}$ | |
| $MgO \cdot SiO_2$ | $78 \times 10^{-7}$ | |
| $MgO \cdot TiO_2$ | $79 \times 10^{-7}$ | |
| $2MgO \cdot SiO_2$ | $94 \times 10^{-7}$ | |
| $CaO \cdot SiO_2$ | $94 \times 10^{-7}$ | |

In the Table 4, the ratio of the first oxide filler represents a ratio of it to the parent glass. Such a first oxide filler is a stabilizing oxide with a high strength and a low coefficient of the thermal expansion. The first oxide filler is uniformly dispersed to the parent glass to keep its thermal expansion coefficient at less than 80 to $85 \times 10^{-7}$° C. Accordingly, it can prevent deformation and crack formation is in the substrate due to a difference in the thermal expansion from a soda-lime substrate used as the substrate of the PDP device and an accumulated stress. Also, $TiO_2$ and $ZrO_2$ in the first oxide filler serve to improve a crystallization of the sealing glass so that they can enhance airtightness of the sealing glass. The first oxide filler is added to 5 to 30 weight % $SiO_2$—$ZnO$—$B_2O_3$ group or $P_2O_5$—$ZnO$—$BaO$ group parent glass including at least one of various types of first oxide fillers described in the above Table 4 depending upon a required characteristic of the sealing glass.

The type and characteristic of the second oxide filler added to the parent and the composition ratio of the second oxide filler are indicated in the following Table 5.

TABLE 5

| TYPE | $B_2O_3$ | $NaNO_3$ | LiI | $LiNO_3$ | $KNO_3$ |
|---|---|---|---|---|---|
| MELTING POINT | 460 | 308 | 446 | 255 | 339 |
| COMPONENT (WEIGHT %) | | | 1–20 | | |

In the Table 5, the composition of the second oxide filler represents a ratio of it to the parent glass. Such a second oxide filler is an oxide with a low melting point of less than 500° C. and which serves to reduce an activation energy and to accelerate a sintering reaction due to a fluidity increase. Specifically, when the second oxide filler is added to the parent glass, alkali elements Li, Na, K and B which are main components of the second oxide filler make a non-cross-linked oxygen instead of a cross-linked oxygen to separate a continuous web structure of the parent glass, thereby reducing a sintering temperature of the parent glass. Accordingly, the sealing glass is capable of a plasticity at a low temperature of less than 500° C. at which a thermal deformation of the upper and lower substrate occur. Also, a crystallization is accelerated due to a reduction of the activation energy caused by the fluidity enhancement, so that the sealing glass has a dense structure. Such a second oxide filler is added to 1 to 20 weight % $SiO_2$—$ZnO$—$B_2O_3$ group or $P_2O_5$—$ZnO$—$BaO$ group parent glass including at least one of various types of first oxide fillers described in the above Table 5 depending upon a required characteristic of the sealing glass.

Furthermore, a sealing glass composition according to a fourth embodiment of the present invention includes only any one of the $SiO_2$—$ZnO$—$B_2O_3$ group or $P_2O_5$—$ZnO$—$BaO$ group parent glass and the first oxide filler.

Figure 4:
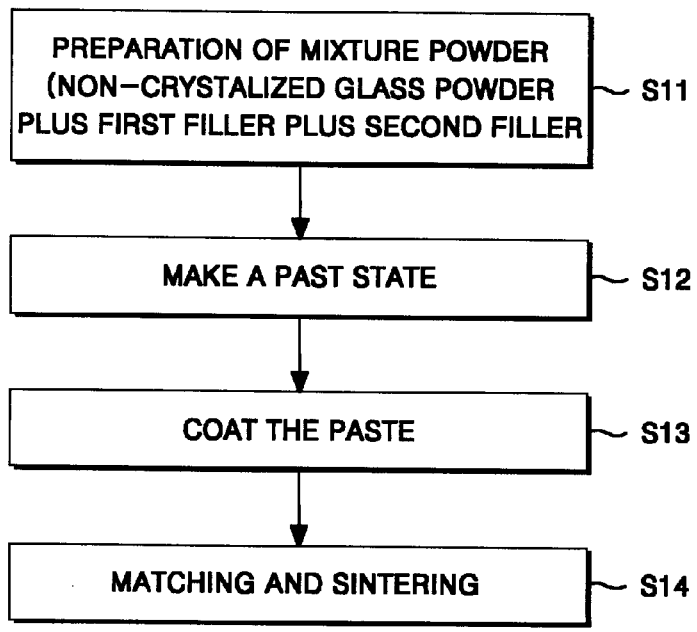
FIG. 4 is a flow chart for explaining a sealing glass formation method using a composition of sealing glass according to an embodiment of the present invention.

FIG. 4 is a flow chart for explaining a method of forming a sealing glass using a composition of sealing glass according to the third embodiment of the present invention. Referring to FIG. 4, in step 10, $SiO_2$—$ZnO$—$B_2O_3$ group or $P_2O_5$—$ZnO$—$BaO$ group parent glass powder and first and second filler powder is mixed to prepare a mixture powder. In this case, the mixture powder is prepared by preparing the $SiO_2$—$ZnO$—$B_2O_3$ group or $P_2O_5$—$ZnO$—$BaO$ group parent glass powder and thereafter mixing it with the first and third oxide fillers.

The procedure of preparing the parent glass powder will be described in detail. First, a raw material of the parent glass indicated in the above Table 2 or Table 3 is weighed in accordance with the composition ratio and mixed during about 10 hours using a tumbling mixer. Then, the mixed raw material is melted using an electrical melting furnace. In this case, as for the melting condition, the melting temperature is set to 1100° C. and the melting time is set to about 5 hours. The melted glass is stirred two or three times using a stirrer so as to keep the uniformity, thereby having a dense organization. Subsequently, the melted glass is suddenly cooled using a quenching roller to make glass cullets. The glass cullets are ground during 32 hours by exploiting the ball milling technique and passed into the #170 and #270 sievers in turn whereby parent glass powder with a low melting point having a good granularity of less than about 3 µm in an average particle size is prepared. The parent glass powder prepared in the above-mentioned procedure is mixed with the first and third oxide filler powder described in the above Table 4 and Table 5, respectively, in accordance with the composition ratio to prepare the mixture powder. In this case, the parent glass powder and the first and third oxide filler powder are mixed during about 7 hours within the tumbling mixer and thereafter the mixed powder is put into a dry oven with a temperature of 150° C. to dry it during about two hours, whereby the mixed powder is prepared.

In step 12, the mixture powder prepared in the step 10 is mixed with an organic vehicle at a desired ratio to make it a paste state. In this case, a viscosity of the sealing glass paste is preferably about 100,000 cps. Then, in step 13, the sealing glass paste is coated on the upper plate using the screen printing technique. In this case, it is desirable that the sealing glass paste is coated to have a width of about 1 cm and a height of 200 µm at the edge portion of the upper substrate. In step 14, the upper plate and the lower plate coated with the sealing glass paste is matched and then the sealing glass paste is sintered to thereby complete a sealing of the upper and lower plates 28 and 30. In this case, the upper and lower plates 28 and 30 matched by the sealing glass paste is sintered for about 20 minutes at a temperature less than 500° C. under oxidation atmosphere using the resistance furnace and then is slowly cooled to form the sealing glass 32, thereby completing a sealing of the upper and lower plates 28 and 30. Herein, a sintering temperature of the sealing glass paste is determined by a crystallization temperature obtained from the differential thermal analysis, hereinafter referred to as "DTA analysis", on the mixture powder. In this case, the sintering temperature has a slight difference depending on the mixed filler and the size of powder, but it is preferably less than 500° C. This is caused by a fact that the thermal deformation of a soda-lime glass used as the substrate can be generated when the sintering temperature is above 500° C. On the other hand, when the sintering temperature is too low, many air pores exist due to an incomplete plasticity of the sealing glass paste to reduce the airtightness, so that the exterior air flows into a discharge space being kept at about 300 to 500 Torr to deteriorate a discharge characteristic. Further at an inadequate sintering temperature a sufficient wetting of the sealing glass paste with the substrate is not made reducing a strength of the sealing glass. An organic matter contained in the paste is eliminated in the course of sintering such a sealing glass paste.

The present invention has described as an example only the case where the sealing glass composition is applied to the PDP device, but it is easily applicable to other display devices (e.g., field emission display, etc.) requiring a sealing between the substrates.

As described above, the sealing glass composition according to the present invention uses a glass of non-PbO group or low PbO group, so that it can improve an environment contamination caused by the PbO and increase the working efficiency. Also, the sealing glass composition according to the present invention includes a glass of non-PbO or low PbO group, a first oxide filler having the characteristic of a low expansion and a high temperature stability and a second oxide filler having a melting point of less than 500° C., so that it can prevent the deformation and crack of the substrate caused by the thermal and mechanical stress and reduce the sintering temperature, thereby enhancing the airtightness of the sealing glass. Accordingly, the sealing glass composition improves the airtightness of the PDP device, so that it can prevent a deterioration in the discharge characteristic caused by an inflow of the exterior air.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A sealing glass composition for sealing an upper plate and a lower plate, comprising:
    a glass of an $SiO_2$—$ZnO$—$B_2O_3$ group and containing less than 20 weight % PbO and having a sintering temperature of less than 500° C. and further comprising a first oxide filler having a low coefficient of thermal expansion and a second oxide filler having a melting point of less than 500° C.

2. The sealing glass composition as claimed in claim 1, wherein the glass of $SiO_2$—$ZnO$—$B_2O_3$ group includes 25 to 45 weight % ZnO, 15 to 25 weight % $SiO_2$, 12 to 25 weight % $B_2O_3$, 3 to less than 20 weight % PbO, 2 to 10 weight % $K_2O$, 2 to 8 weight % $Na_2O$, 1 to 7 weight % $Al_2O_3$, 0 to 5 weight % $Li_2O$, and 1 to 5 weight % CaO.

3. The sealing glass composition as claimed in claim 1, wherein the first oxide filler is included by 5 to 30 weight %.

4. The sealing glass composition as claimed in claim 1, wherein the first oxide filler contains at least one of $TiO_2$, $\alpha$-$Al_2O_3$, $CaO.SiO_2$, $2MgO.2Al_2O_3.5SiO_2$, $Li_2O.Al_2O_3.4SiO_2$, $BaO.Al_2O_3.2SiO_2$, $CaO\;Al_2O_3.2SiO_2$, $MgO.SiO_2$, $MgO\;.TiO_2$ and $2MgO.SiO_2$.

5. The sealing glass composition as claimed in claim 1, wherein the second oxide filler is included at the level of 10 to 40 weight %.

6. The sealing glass composition as claimed in claim 1, wherein the second oxide filler contains at least one of LiI, $LiNO_3$, $NaNO_3$, $KNO_3$ and $B_2O_3$.

7. The sealing glass composition as claimed in claim 1, wherein the sealing glass composition is applied to a glass panel of a flat panel display device.

8. The sealing glass composition as claimed in claim 1, wherein the sealing glass composition is applied to a sealing glass panel of a plasma display device.

9. A sealing glass composition comprising:
    a glass of an $SiO_2$—$ZnO$—$B_2O_3$ group having a sintering temperature less than 500° C. and including 25 to 45 weight % ZnO, 15 to 25 weight % $SiO_2$, 12 to 25 weight % $B_2O_3$, 3 to 20 weight % PbO, 2 to 10 weight % $K_2O$, 2 to 8 weight % $Na_2O$, 1 to 7 weight % $Al_2O_3$, 0 to 5 weight % $Li_2O$, and 1 to 5 weight % CaO.

10. A sealing glass composition having a sintering temperature of less than 500° C. comprising a glass of a $P_2O_5$—$ZnO$—$BaO$ group including 45 to 65 weight % $P_2O_5$, 10 to 20 weight % ZnO, 2 to 10 weight % $Li_2O$, 3 to 15 weight % BaO, 1 to 6 weight % CaO, 1 to 7 weight % $Al_2O_3$, and 1 to 5 weight % $B_2O_3$.

11. A sealing glass composition comprising:
    a glass of a $P_2O_5$—$ZnO$—$BaO$ group and containing less than 20 weight % PbO and a first oxide filler having a low thermal expansion coefficient and a second oxide filler having a melting point of less than 500° C. wherein the sealing glass composition sintering temperature is less than 500°.

12. The sealing glass composition as claimed in claim 11, wherein the first oxide filler is included by 5 to 30 weight %.

13. The sealing glass composition as claimed in claim 11, wherein the first oxide filler contains at least one of $TiO_2$, $\alpha$-$Al_2O_3$, $CaO.SiO_2$, $2MgO.2Al_2O_3.5SiO_2$, $.Li_2O\;.Al_2O_3.4SiO_2$, $BaO.Al_2O_3.2SiO_2$, CaO, $.Al_2O_3.2SiO_2$, $MgO$-$.TiO_2$ and $2MgO.SiO_2$.

14. The sealing glass composition as claimed in claim 11, wherein the second oxide filler is included at a level of 10 to 40 weight %.

15. The sealing glass composition as claimed in claim 14, wherein the second oxide filler contains at least one of LiI, $LiNO_3$, $NaNO_3$, $KNO_3$ and $B_2O_3$.

16. The sealing glass composition as claimed in claim 14, wherein the sealing glass composition is applied to a glass panel of a flat display device.

17. The sealing glass composition as claimed in claim 14, wherein the sealing glass composition is applied to a glass panel of a plasma display device.

* * * * *